Patented July 1, 1930

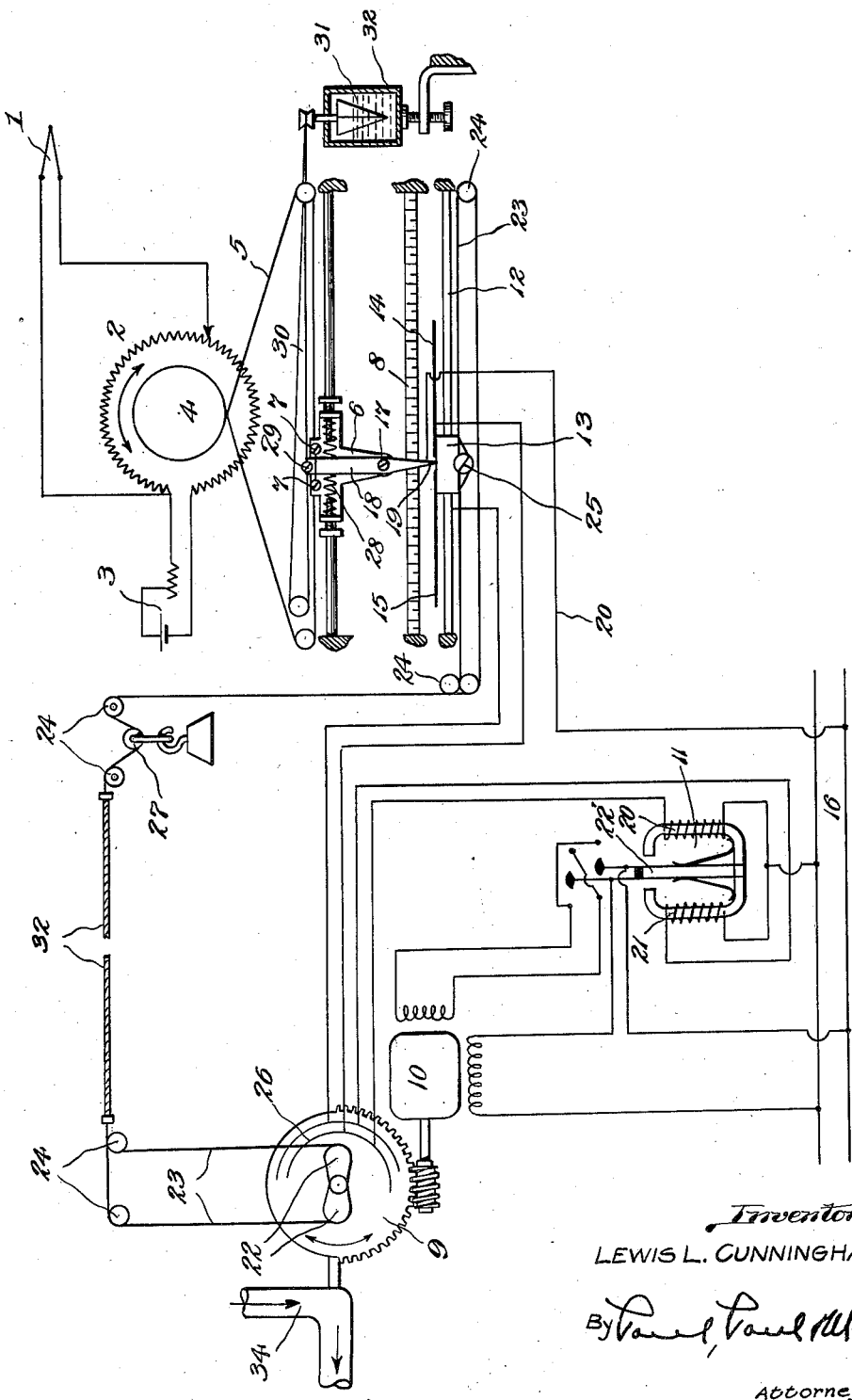

1,768,890

UNITED STATES PATENT OFFICE

LEWIS L. CUNNINGHAM, OF MINNEAPOLIS, MINNESOTA, ASSIGNOR TO MINNEAPOLIS-HONEYWELL REGULATOR COMPANY, OF MINNEAPOLIS, MINNESOTA, A CORPORATION OF DELAWARE

TEMPERATURE-REGULATING SYSTEM REISSUED

Application filed July 23, 1924, Serial No. 727,836. Renewed November 16, 1929.

This invention relates to an improved system for the control of furnace or other temperatures, having special reference to conditions where it is desirable to have the temperature under control vary as little as is practicable between predetermined limits. The source of heat may be any, such as gas, oil, or electricity, the delivery of which energy to the furnace may be controlled by any mechanism which may be actuated by a reversible electric motor.

The method here described is a departure from the commonly used ones of "two point" control. In the latter method a thermometer of some kind having a moving indicator is utilized to close and open an electric circuit through a solenoid which operates a valve or other mechanism to control the heat input to the furnace under control. When the temperature drops to a pre-determined point contact is made or broken, as the case may be, and the control of heat supply operates to supply more heat to the furnace. The temperature then rises and at a pre-determined temperature the reverse operation takes place.

It is clear that with this system the heat input to the furnace is never accurately adjusted to the requirements of the furnace. It is either too high or too low all the time, with a consequent surging back and forth of the temperature past the desired operating point. The purpose of the system herein described is to automatically supply heat at a steady rate and so adjusted as to maintain the temperature evenly between the permissible upper and lower operating limits and very close to the desired operating point.

In the accompanying drawing a special type of thermometer is indicated but the system is not necessarily limited in its application to this type of instrument. Referring to the drawing:

At 1 is a thermo-couple element assumed to be located at the point the temperature of which it is desired to control, the thermo-couple element being connected to the potentiometer system indicated at 2 and 3. The flexible cord 5 passes around the drum 4 which is mechanically rigid with the resistance 2 of the potentiometer. An automatic self balancing apparatus, not shown, operate to rotate the drum 4 until the electromotive force developed by the thermo-couple 1 is balanced by the potential drop in the resistance 2 between the points to which the thermo-couple 1 is connected. This motion of the drum 4 is carried by the cord 5 to the sliding member 6 to which the cord 5 is attached by the screws 7. When properly calibrated, therefore, the position of the sliding member 6 with respect to the scale 8 is a measure of the temperature at the point at which the thermo-couple 1 is located. This mechanism is not part of the invention but it indicates a type of thermometer to which the invention may be applied.

In this description, as in actual practice, movement of the member 6 to the left indicates a lowering of the temperature under control and movement to the right indicates a rising temperature.

At 9 is indicated a gear rigidly attached, or geared in any desired ratio, to a valve or controller 34 the movement of which will alter the rate of delivery of heat energy to the point where the thermo-couple 1 is located. The gear 9 may be attached to the rotor of a voltage regulator or a valve controlling gas or air, or other medium, and it may be mechanically connected to another valve so that gas and air may be controlled simultaneously. It is clear that the actual means of control of the heat supply will be varied to suit various conditions and the source of the heat energy which is used. Rotation of the gear 9 in one direction may be taken as resulting in a decrease in the rate at which heat energy is delivered to the furnace and rotation in the opposite direction may be taken as resulting in an increase in the rate.

The essential parts of the invention may now be described:

Suitably geared, or otherwise attached, to the gear 9 is the reversible motor 10. A series wound motor is indicated but any reversible motor may be used. Connected to control the motor for either direction of rotation is the selectively operated relay 11. Slidably mounted on the rigid bar 12 is the block 13. Carried on the block 13 but insulated from it and each other are the contacting bars 14 and 15. The contacting bars 14 and 15 are connected, each through a separate coil of the relay 11 to one side of the electric supply line at 16. Pivotally mounted at 17 on the indicator 6 is the bar 18 carrying the contact point 19. The contact point 19 is connected to the opposite side of the supply line by the conductor 20. Now, if the indicator 6 moves sufficiently, as it will do with a sufficient change of temperature at the point 1, then the contact 19 will connect with a contacting bar, either 14 or 15, depending on the direction of the temperature change at the point 1. Assume that the temperature moves downward, then the contact bar 15 will connect with the contact point 19 and a circuit will be closed through the coil 20 of the relay 11. The armature 22' of the relay 11 will then be drawn to the right and the motor circuit closed. The motor will then rotate in a pre-determined direction so as to increase the rate of heat delivery to the point under temperature control. Conversely, contact of the point 19 with the bar 14 will result in rotation of the motor 11 in the opposite direction and the rate of heat delivery to the point under temperature control will be decreased.

It is clear that the motor 10 will continue to operate as long as, for example, the point 19 and the bar 15 remain in contact, but that a slight motion to the left of the sliding member 13 would break the contact between the point 19 and the bar 15 and that when this would happen the motor 10 would stop. This would result in an adjustment of the rate of delivery of heat energy to the point under temperature control and it is clear that by properly controlling the motion of the sliding member 13 that any desired control of temperature may be effected. To produce a horizontal motion of the member 13 having a definite relation to the angular motion of the gear 9, and therefore to the indicator 6, the following apparatus is provided:

Fastened to the cam shaped member 22, which rotates with the gear 9, is a flexible, inextensible cable, such as piano wire, indicated at 23. The wire 23 passes over suitably arranged pulleys at 24 and may also pass through a flexible housing such as flexible steel tubing, indicated at 32. At 25 is a screw by means of which the wire 23 may be securely, but adjustably, fastened to the sliding member 13. It is now clear that rotation of the gear 9 will result in a horizontal motion of the sliding member 13 and also that the movement of the sliding member 13 may be made any desired function of the rotation of the gear 9 by suitably altering the size and shape of the cam 22. It may therefore be assumed that a given amount of rotation of the gear 9 will result in any desired horizontal movement of the sliding member 13.

Therefore by properly arranging the electrical and mechanical connections, when contact is made between the bar 15 and the point 19 then the sliding member 13 will be moved to the left until the contact is broken, when the motor will stop. If the temperature at the point where the thermo-couple 1 is located continues to fall the indicator 6 will again be moved to the left and contact will again be made between the bar 15 and the point 19 which will result in a still further rotation of the gear 9 and a consequent increase in the rate of delivery heat energy to the point under temperature control. This operation will be repeated until a heat balance is attained or until the control operated by the gear 9 has reached its full supply position. Obviously, beyond this point rotation of the gear 9 is not desirable and the limit switch 26 is therefore provided so that, for example, when the maximum heat input position of the gear 9 is attained the connection between the bar 15 and the coil 20 is broken and the system therefore becomes inoperative as regards a lower temperature. At this point, however, the bar 14 and the coil 21 are still connected so that if the temperature at the point of control rises and the indicator 6 moves to the right then the circuit through the coil 21 will be closed by means of the bar 14 contacting with the point 19. The relay 11 will then operate to cause the motor 11 to rotate in the opposite direction and the sliding member 13 will move to the right till the contact between the bar 14 and the point 19 is broken. This operation will then be repeated till a heat balance is attained. It will be noted that the coil 20 of the relay 11 again becomes operative as soon as the sliding member 13 has moved appreciably to the right.

In practice it is usual that the furnace temperature is required to be limited between definite upper and lower limits. For example the normal temperature may be 1000 degrees with a permissible variation of 25 degrees plus or minus, giving a range of 50 degrees. In this case the cam 22 and the mechanical connection of the gear 9 to the heat control unit 34 would be so proportioned that the motion of the gear 9 through its full range would result in moving the indicator 6 through a distance representing 50 degrees on the scale 8.

Clearly when the indicator 6 would indicate 975 degrees the heat supply mechanism would be in the position corresponding to the maximum rate of delivery of heat energy and when the indicator 6 would indicate 1025 degrees the heat supply mechanism would be at the position of minimum rate of heat delivery. The apparatus would therefore always tend to adjust itself so as to produce a stable operating temperature between the operating limits for which it was adjusted.

In many cases it is found desirable to accelerate the rate of heat input to the furnace with an increasing departure from the normal temperature. With this system this may be very easily accomplished by alteration of the shape of the cam 22. For, example, in the position shown in the drawing a motion of the gear 9 will be reproduced on a certain scale by the indicator 6. If, however, the gear 9 be turned through approximately 90 degrees then much more motion of the gear 9 will be required to produce equivalent motion of the indicator 6. The rate of heat delivery may therefore be made to be in any desired function of the departure of the temperature at the point 1 from the normal temperature by suitable alteration of the shape and size of the cam 22.

To provide for alteration of the effective length of the cable 23 between the cam 22 between the cam and the sliding member 13 by reason of the shape of the cam 22 pulleys 27 are provided which may be attached either to a weight as indicated or to a spring so as to take up slack. This will also compensate for any change in room temperature which by reason of expansion and contraction of the cable 23 might affect the mechanical relation of the cam 22 and the sliding member 13.

Provision is made for changes which may be required in the point of temperature control by having the cable 23 adjustably fastened to the sliding member 13 by means of the screw 25. For example, if the gear 9 be placed in the position corresponding to half the full rate of heat delivery and then the sliding member 13 be secured to the cable 23 at the position along the scale 8 which corresponds to the desired point of temperature control then the system will immediately operate in such a way as to tend to bring the temperature at the point of control to the desired value.

It is to be noted that in normal operation no appreciable length of the bars 14 and 15 is required for under normal conditions the contact point 19 is always between them and only a short distance from either of them. By having the bars 14 and 15 of a sufficient length, however, the system will always tend to operate to a balance even though initially the position of the indicator 6 is far removed from that of the sliding member 13.

In many cases where the temperature of the furnace under control is subject to sudden and comparatively large variations due to loading or other conditions it is desirable as far as possible to have the control system anticipate these changes. To meet these conditions the contact point 19 may be mounted on a bar such as 18 which is pivotally mounted at 17 on the indicator 6. At 28 are springs so arranged, by means of brackets and adjusting screws carried on the indicator 6, that they tend to maintain the bar 18 at right angles to the direction of motion of the indicator 6. Fastened to the bar 18 by the screw 29 is the cable 30 passing over suitably arranged pulleys to the spindle of the rotary dashpot 31. The dashpot 31 is so arranged that by altering the height of the container 32 that the retarding effect of the dashpot may be altered at will. It is clear that a sudden motion of the indicator 6 due to a sudden change of the temperature at the point of control will result in disturbing the right angular position of the bar 18 with respect to the direction of motion of the indicator 6. In this case the gear 9 will be rotated further than would be the case in the absence of the effect of the dashpot and the rate of heat input to the furnace will therefore be accelerated more than would otherwise be the case. By suitably adjusting the retarding effect of the dashpot system the rate of heat input to the furnace may therefore be made any desired function of the rate of change of the temperature under control. It is to be noted that this action is superimposed upon the already described action due to the actual departure of the temperature from the normal value.

It is clear that the pivot bar 18 may also be mounted on the sliding member 13 and substantially the same results, due to the dashpot action may be obtained.

Under certain conditions it may be desirable to have the motor 10 rotate appreciably after the contact between the contact point 19 and the bar 14 or 15 is broken so that the adjustments of the rate of heat input will be fewer but of larger value. In this case the armature shaft of the motor 10 may be equipped with a flywheel of any desired moment of inertia so that after the current is cut off from the motor 10 that it will rotate appreciably. This will result in the control steps being somewhat larger but less often. Conversely an automatic solenoid operated brake may be used which will release while voltage is applied to the motor but will grip instantly when the voltage is cut off. Operating conditions will determine which of these methods should be used, or, in many cases neither will be used as the moment of inertia of the armature will be sufficient to supply the necessary over-run.

It is clear that the operation of this system is not necessarily confined to use with a temperature indicator having a straight line horizontal motion such as the one used for illustration. Many indicators have a circular motion and it is obvious that the system may be adapted to this circular motion without altering the essential elements of the invention. I therefore reserve the right to all such modifications as may fall within the spirit of the appended claims.

I claim:—

1. In a temperature control system the combination of a temperature indicating member automatically movable in response to change of temperature at the point of temperature control; a rotative energy control member actuated by a reversible electrical motor; electrically operated means of reversing the direction of rotation of the said electrical motor; a pair of electrical contacts, fixed with respect to each other, co-operating with an electrical contact associated with the said indicating member for the control of the direction of rotation of the said electrical motor; and mechanical means of moving the said electrical contacts in a pre-determined, but variable, function of motion of the said rotative energy control member.

2. In a temperature control system the combination of a temperature indicating member automatically movable in response to change of temperature at the point of temperature control; a rotative energy control member actuated by a reversible electrical motor; electrically operated means for reversing the direction of rotation of the said electrical motor; a pair of electrical contacts, fixed with respect to each other, co-operating with an electrical contact, associated with the said indicating member, for the control of the direction of rotation of the said electrical motor; flexible cable means of transmitting motion of the said rotative energy control member to the said pair of electrical contacts; and a cam shaped member adapted to co-operate with the said flexible cable means and to pre-determine for different angular positions of the said rotative energy control member, the ratio of motion of the said pair of movable contacts with respect to motion of the said rotative energy control member.

3. A temperature control system including an electrical contact carried by a temperature indicating member; a pair of movable electrical contacts, fixed with respect to each other and co-operating with the said electrical contact, for the reversible control of an electrical motor; a heat delivery control member actuated by the said electrical motor; a cam shaped member in mechanical relation with the said heat control member; a flexible cable, adapted by means of pulleys, to transmit motion of the said cam shaped member to the said pair of electrical contacts so that motion of the said pair of electrical contacts may be in any desired function of motion of the said heat control member, and the resultant control of the rate of heat delivery to the point under temperature control may be in any desired function of the temperature at the point under temperature control.

4. A temperature control system including a pair of electrical contacts adapted to co-operate with an electrical contact, movable in response to change of temperature at the point under temperature control, for the control of an electrical motor, said motor being adapted to actuate a heat delivery control member; mechanical means of transmitting, in any desired ratio, motion of the said heat delivery control member to a flexible cable, said cable being adapted to move the said pair of electrical contacts, and mechanical means adapted to movably fix the position of the said pair of electrical contacts relative to a fixed point on the said flexible cable so that the normal point of temperature control may thereby be changed.

5. A temperature control system having a temperature indicator; an electrical contactor carried by the said temperature indicator; a pair of contacts movable in response to motion of a heat control member; a motor to actuate the said heat control member, the said motor being controlled by co-operation of the said movable contacts and the said contact carried by the said temperature indicating member; and dashpot means of altering co-operation of the said movable contacts and the said contact so that resulting control of the rate of heat delivery to the point under temperature control may be in a pre-determined, but changeable, function of the rate of change of temperature at the point under temperature control.

6. A temperature control system having a temperature indicator; an electrical contact carried by the said indicator; a pair of contacts movable in response to motion of a heat control member; a motor adapted to actuate the said heat control member, the said motor being controlled by co-operation of the said movable contacts and the said contact carried by the said indicating member; and dashpot means of altering co-operation of the said movable contacts and the said contact so that resulting control of the said electric motor, and therefore control of the rate of heat delivery to the point under temperature control, may be in a pre-determined, but changeable, function of rate of change of temperature at the point under temperature control.

7. A temperature control system having a temperature indicating member automatically movable in response to change of temperature at the point under temperature control; an electrical contact mechanically associated with the said indicating member; electrical contacts adapted to co-operate with the said contact for the reversible control of an electrical motor, the said motor being adapted to actuate a heat delivery control member; and mechanical means of limiting motion of the said heat delivery control member by breaking an electric circuit controlling the said electrical motor.

8. A device of the class described comprising a first contact, and means automatically thermally operable to move the contact in opposite direction, a pair of contacts fixed to move in unison and separately engageable with or by the first contact, a movable element carrying a limit switch, mechanical connections for obtaining movements of said pair of contacts, by said movable element, and means for obtaining reversing motions of said movable element, including electrical connections between said limit switch, said first contact, and said pair of contacts.

9. A device of the class described comprising a first contact, and means automatically thermally operable to move the contact in opposite direction, a pair of contacts fixed to move in unison and separately engageable with or by the first contact, a movable element carrying a limit switch, mechanical connections for obtaining movements of said pair of contacts by said movable element, and means for obtaining reversing motions of said movable element, including electrical connections between said limit switch, said first contact, and said pair of contacts, said first and said pair of contacts being slidable with respect to each other.

10. A device of the class described comprising a first contact, and means automatically thermally operable to move the contact in opposite direction, a pair of contacts fixed to move in unison and separately engageable with or by the first contact, a movable element carrying a limit switch, mechanical connections for obtaining movements of said pair of contacts, by said movable element, and means for obtaining reversing motions of said movable element, including electrical connections between said limit switch, said first contact, and said pair of contacts, said movable element being rotatable and said first and said pair of contacts being slidable with respect to each other.

11. A device of the class described comprising a first contact, and means to move the contact in opposite directions, a pair of contacts fixed to move in unison to separately engage with or by the first contact, a movable element having a limit switch, connections for obtaining movements of said pair of contacts by said movable element, and means for obtaining reversing motions of said movable element including electrical connections between said limit switch, said first contact, and said pair of contacts.

12. A device of the class described comprising a first contact and means to move the contact in opposite directions, a pair of contacts fixed to move in unison to separately engage with or be engaged by the first contact, a reversible motor, a movable element having geared connection with said motor, means for causing the pair of contacts to be moved as the result of motion of the movable element, means controlled as the result of motion of said movable element to limit its motion, and means for obtaining reversing motions of the motor including electrical connections between said motion limiting means, said first contact and said pair of contacts.

13. A device of the class described comprising a first contact and means to move the contact in opposite directions, a pair of contacts fixed to move in unison to separately engage with or be engaged by the first contact, a reversible motor, a movable element having geared connection with said motor, means for causing the pair of contacts to be moved as the result of motion of the movable element, electrical means controlled as the result of motion of said movable element to limit its motion, and means for obtaining reversing motions of the motor including electrical connections between said motion limiting means, said first contact and said pair of contacts.

14. A device of the class described comprising a first contact, and means to move the contact in opposite directions, a pair of contacts fixed to move in unison to separately engage with or be engaged by the first contact, a movable element, means for causing the pair of contacts to be moved as a result of motion of the movable element, a limit switch controlled by the motion of said movable element, and means for obtaining reversing motions for said movable element, including electrical connections between said limit switch, said first contact and said pair of contacts.

15. A device of the class described comprising a first contact and means to move the contact in opposite directions, a pair of contacts fixed to move in unison to separately engage with or be engaged by the first contact, a movable element, means for causing the pair of contacts to be moved as the result of motion of the movable element, means controlled as the result of motion of said movable element to limit its motion, and means for obtaining reversing motions of said movable element including connections between said motion limiting means, said first contact and said pair of contacts.

16. A device of the class described comprising a first contact, and means to move the contact, a pair of contacts fixed to move in unison to separately engage with or be engaged by the first contact, a movable element, means for causing the pair of contacts to be moved as a result of motion of the movable element, means controlled by said movable element to limit its motion in opposite direction, and means for obtaining motion for said movable element including electrical connections between said motion limiting means, said first contact and said pair of contacts.

In testimony whereof I affix my signature.

L. L. CUNNINGHAM.